March 17, 1959     W. F. MINARD     2,878,365
CONTROL SYSTEM
Filed Dec. 21, 1956     2 Sheets-Sheet 2

INVENTOR.
William F. Minard
BY John L. Stoughton
HIS ATTORNEY.

United States Patent Office 2,878,365
Patented Mar. 17, 1959

2,878,365

CONTROL SYSTEM

William F. Minard, Plymouth, Mich., assignor to Weltronic Company, Detroit, Mich., a corporation of Michigan Application December 21, 1956, Serial No. 629,882

18 Claims. (Cl. 219—114)

This invention relates generally to control apparatus and, more particularly, to an apparatus for controlling the flow of electrical energy from a polyphase source to a single phase load such as the electrodes of a resistance welder.

An object of this invention is to provide a new and improved network of the character described.

Another object is to provide such a network which is less complicated than prior art devices and which is, therefore, less expensive.

Another object is to provide such a network which will require a minimum of maintenance.

Another object is to provide such a network which is positive and dependable in operation.

Figure 1:
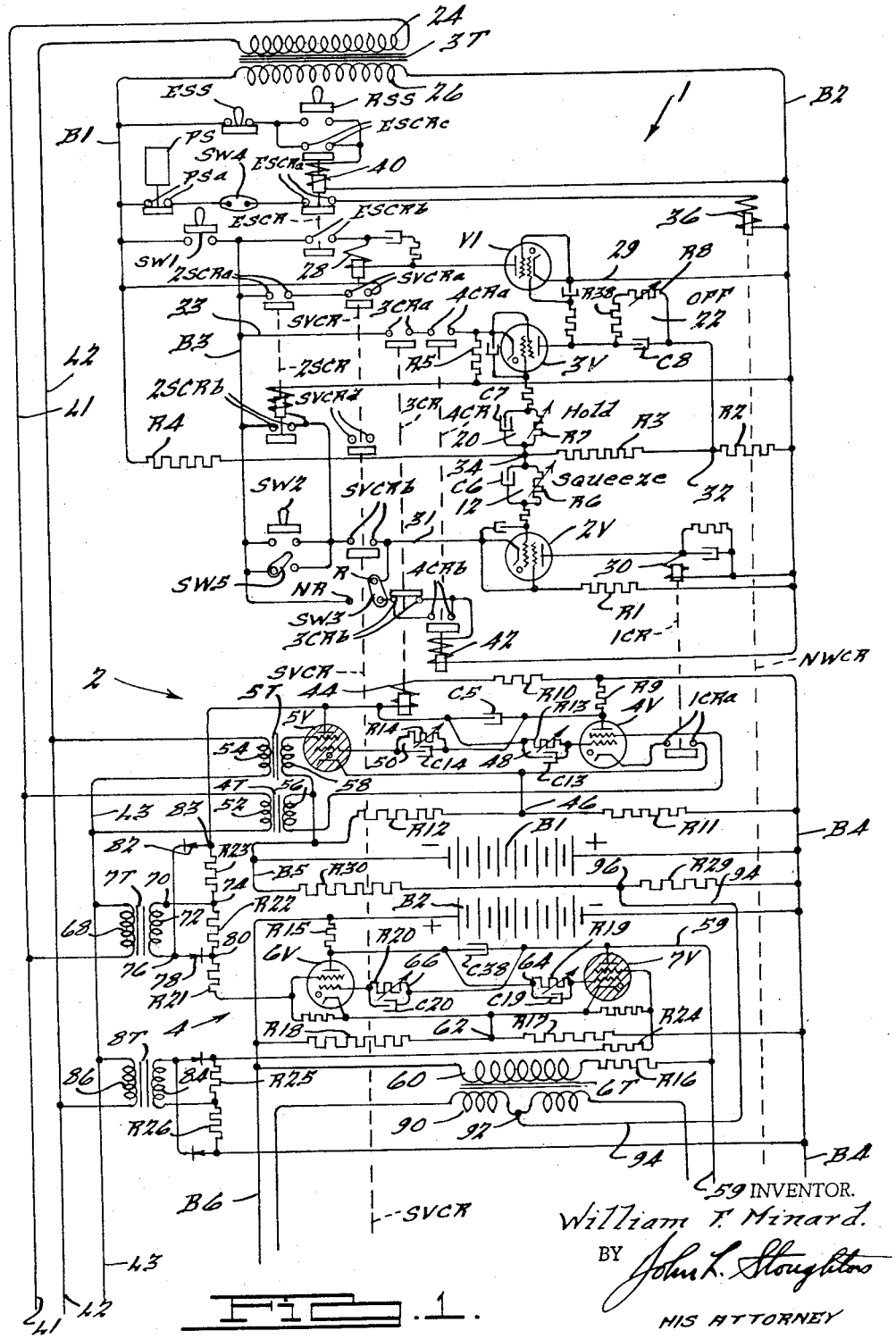
Figure 2:
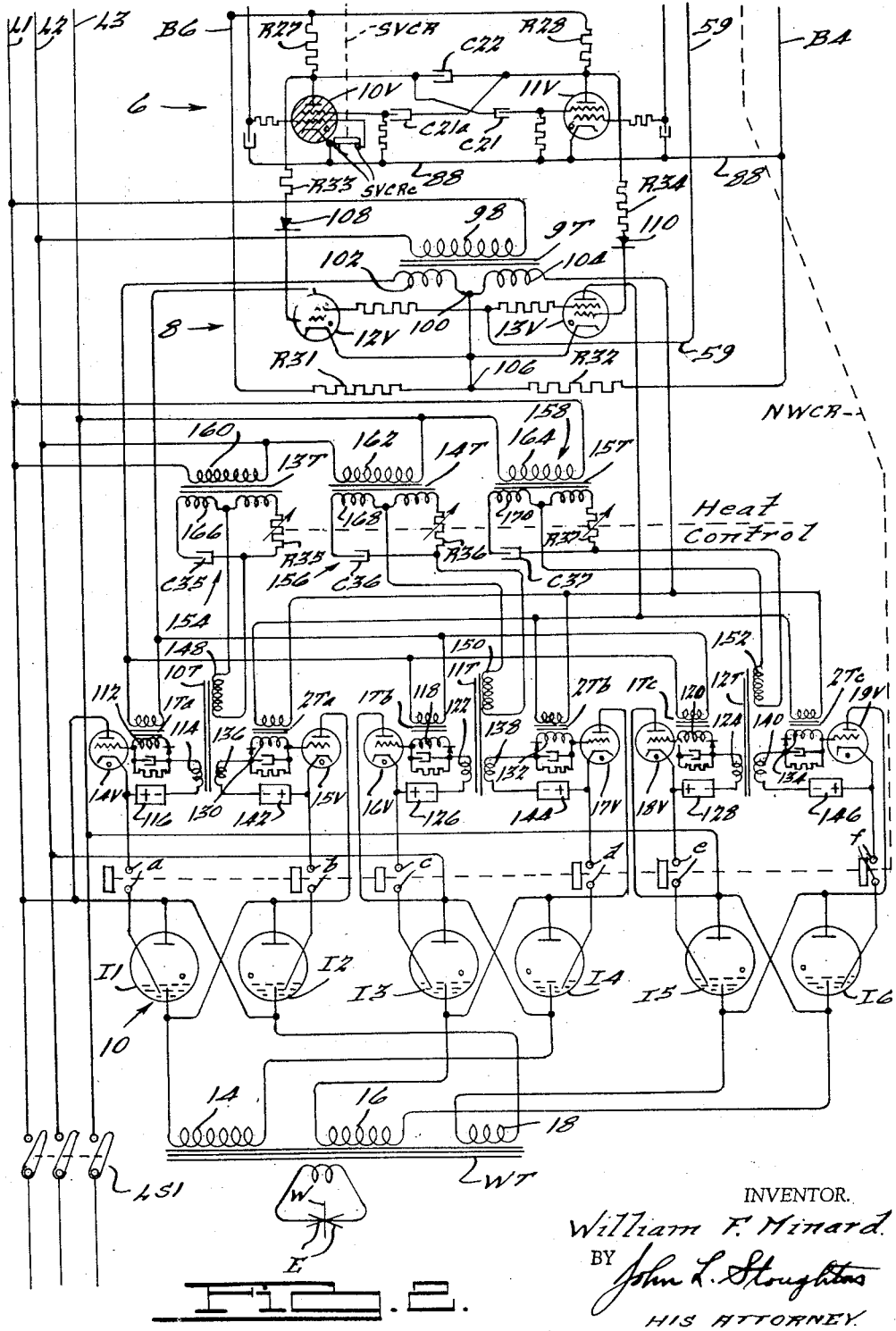

Other objects will be apparent from the description, the hereinafter appended claims and the drawings, in which drawings Figs. 1 and 2, when arranged end to end collectively, schematically illustrate a network embodying the invention.

Referring to the drawings by characters of reference, the control network comprises a sequencing section 1 comprising the tubes 1V and 2V and 3V; a weld timing network 2 comprising the valves 4V and 5V; a frequency timing network 4 comprising the valves 6V and 7V; a reversing unit 6 comprising the tubes 10V and 11V; a firing unit 8 comprising the tubes 12V and 13V; and a contactor section 10 comprising the ignitrons I1 to I6 and there respective firing valves 14V to 19V.

In general and with the switch SW5 closed, closure of the pilot switch SW1 initiates operation of the sequencing network 1 causing the electrodes E to be placed against the work W in the normal manner by mechanism well known in the art and not illustrated. Initiation of the sequencing network 2 also causes the squeeze time network 12 to time out (assuming switch SW5 to be closed), at the end of which time the valve 2V conducts to energize the control relay 1CR in its anode circuit whereby the contacts 1CRa thereof close to actuate the weld timing network 2 which thereupon actuates the frequency controlling network 4. Upon being actuated the network 4 actuates the reversing network 6 which thereupon causes the valve 12V of the firing network 8 to conduct and energize the transformers 1Ta, 1Tb, and 1Tc (collectively referred to as 1T) whereby the firing thyratrons 14V, 16V, and 18V are rendered conducting to fire their respective ignitions I1, I3, and I5, causing current to flow through the primary windings 14, 16 and 18 of the welding transformer WT. At the end of a predetermined timing interval as determined by the network 4, the network 6 is actuated for welding current flow in the reverse direction thereby extinguishing valve 12V and firing valve 13V of the network 8, whereby the transformers 2Ta, 2Tb, and 2Tc (collectively referred to as 2T) in its anode circuit are energized to render the firing thyratrons 15V, 17V, and 19V conductive to fire their associated ignitions I2, I4, and I6 for bulding up flux in the core of the welding transformer in the opposite direction to which flux was built up due to conduction of the ignitions I1, I3, and I5. This alternate build up of flux causes pulses of welding current of opposite polarity (simulated A.-C.) to flow between the electrodes E through the work W.

The network 2 continues to cause reversal of operation of the network 6 whereby the valves 12V and 13V are alternately energized for energizing the electrodes E until the weld timing network 2 times out. When this occurs, the networks 4, 6, 8, and 10 are rendered ineffective and further flow of current ceases. Timing out of the network 2 also sends a signal back to the sequencing network 2 to initiate hold time. This is done when the relay 3CR energizes, closing its contacts 3CRa. At the end of hold time (timing out of the network 20) tube 3V conducts charging the off time network 22 which blocks the valve 1V causing the electrode operating mechanism to move the electrodes E away from the work W. Blocking of the valve 1V also opened the anode circuit of the valve 2V to deenergize the relay 1CR causing its contacts 1CRa to open the cathode circuit of the valve 4V of the weld timing network 2 thereby positively preventing it from again actuating the networks 4, 6, 8, and 10. Blocking of the valve 1V also causes the relay 4CR to become deenergized opening its contacts 4CRa thereby opening the anode circuit of the valve 3V. The opening of the anode circuit of this valve initiated the timing out of the off time network 22. At the end of off time, the blocking bias placed on the valve 1V by this network is removed and if the switch SW1 remains closed, valve 1V will reconduct and a subsequent cycle will be repeated.

Referring in greater detail to each of the above described networks, the sequencing network 1 is energized from a transformer 3T having its primary winding 24 connected between the lines L1 and L2. The secondary winding 26 of this tranformer has one terminal connected to a first bus B1 and its opposite terminal connected to a second bus B2. The values 1V, 2V, and 3V are each connected between the busses B1 and B2. The anode of the valve 1V is connected to the bus B1 through the energizing winding 28 of a solenoid valve controlling relay SVCR, the normally open contacts ESCRb of the emergency stop relay ESCR, and the normally open contacts of the start or initiating switch SW1. The cathode of the valve 1V is directly connected to the bus B2 by a conductor 29. In order to prevent chattering of the relay SVCR, a series connected capacitor and resistor are connected in shunt with the winding 28 in a well known manner.

The anode of the valve 2V is connected through the energizing winding 30 of the control relay 1CR to the bus B2. The cathode of this valve 2V is connected by a conductor 31 to a bus B3. Normally open contacts SVCRb and a normally open second stage pilot switch SW2 are connected in series in conductor 31. The bus B3 is selectively connected to the bus B1 through the normally open switch SW1 or the series connected normally open contacts 2SCRa and SVCRa of the relay 2SCR and SVCR respectively. The cathode of the valve 2V is also connected through a resistor R1 to the bus B2 whereby the potential of this cathode will be, selectively, that of the bus B2 or that of the bus B3.

A plurality of resistors R2, R3, and R4 are connected in series between the bus B1 and B2 and provide a common point or terminal 32 between the resistors R2 and R3 and a common point or terminal 34 between the resistors R3 and R4. The anode of the valve 3V is connected through the off time network 22 to the common terminal 32 and through the resistor R2 to the bus B2. The cathode of the valve 3V is connected to the bus B3 through a conductor 33 having therein the normally open contacts 4CRa of the relay 4CR and 3CRa of the relay 3CR, The cathode of the valve 3V is connected through a resistor R5 to the bus B2 whereby the potential of this cathode like that of the cathode of the valve 2V is selectively that of the bus B2 or that of the bus B3. The controlling grid of the valve 3V is connected through the usual grid current resistor and the hold time network 20 to the terminal 34 while the controlling grid of the valve 2V is connected through the usual grid current limiting resistor and the squeeze time network 12 to this same terminal 34. This arrangement provides for the charging of the networks 12 and 20 when the cathodes of the valves 2V and 3V respectively are at the potential of the bus B2.

A weld-no-weld controlling relay NWCR has its winding 36 connected between the busses B1 and B2. More specifically, one terminal of the winding 36 is directly connected to the bus B2 while its other terminal is connected through the normally open contacts ESCRa of the emergency stop control relay ESCR, the weld-no-weld switch SW4 and the normally closed contacts PSa of the protection switch PS. The weld-no-weld control relay NWCR has normally open contacts a–f in the igniter circuits for the ignitrons I1 to I6 so that the ignitrons may be fired only when the relay NWCR is energized to close its contacts a–f. Opening of the weld-no-weld switch SW4 prevents energization of the relay NWCR and allows the apparatus to be run through its cycle without energization of the welding transformer. The protection switch PS may be of any of the usual variety of tube protecting temperature responsive switch or switches associated with one or more of the ignitrons I1 to I6 acting upon an excessive temperature of the ignitron or ignitrons with which it is associated to open the contacts PSa whereby further operation of these ignitrons is terminated and damage to the same is prevented.

An emergency stop control relay ESCR connected between the busses B1 and B2 is provided to not only terminate further firing of the ignitrons I1–I6 but also to terminate further operation of the various networks 1, 2, 4, 6, and 8. One terminal of the energizing winding 40 of the relay ESCR is connected to the bus B2 and the other terminal is connected through the normally open contacts ESCRc and the normally closed contacts of the emergency stop switch ESS to the bus B1. A normally open resetting switch RSS is connected in shunt with the contacts ESCRc for initially setting the apparatus upon closure of the line switch LS1 or resetting the same after operation of the emergency stop switch ESS.

A repeat-non-repeat switch SW3 selectively connects the energizing winding of the relay 4CR directly to the bus B3 or to the conductor 31 which is connected to bus B3 through the contacts SVCRb and switches SW2 or SW5. More particularly, one terminal of the winding 42 of the relay 4CR is directly connected to the bus B2 and the other terminal is connected through the normally closed contacts 3CRb to the arm of the switch SW3. The contact R is connected to the conductor 31 and the contact NR is connected to the bus B3. The normally open lock-in contacts 4CRb of the relay 4CR are connected in shunt with the contacts 3CRb and serve to lock the relay 4CR conducting when it is initially energized by closure of the contacts 3CRb which occurs at the start of weld time.

The squeeze timing network 12, the hold timing network 20, and the off timing network 22 each comprises an energy storage device such as a capacitor shunted by a variable resistor whereby the charge on the capacitor upon termination of the flow of charging current thereto will decay at a predetermined rate to a critical potential, the time required for these capacitors to discharge to their critical potentials being the timing interval of the respective network. The squeeze time network 12 comprises the variable resistor R6 and capacitor C6, the hold timing network 20 comprises the variable resistor R7 and capacitor C7, and the off timing network 22 comprises the variable resistor R8 and the capacitor C8. In each instance, the critical potential of the respective networks causes the discharge of the networks to their respective critical potential and permits the valves 2V, 3V, and 1V to conduct. As is sometimes done, a resistor like resistor R38 of the network 22 may be used in the networks 12 and 20 to determine the minimum setting thereof.

The weld timing network 2 comprises the aforementioned valves 4V and 5V arranged in a mono-stable multivibrator circuit energized from a suitable source of direct current potential diagrammatically shown as being a battery B1 but which, in actual practice, would usually be a rectified source such as might be supplied by a full wave rectifier energized from a pair of the lines L1, L2, and L3. The source of direct current potential B1 maintains a first bus B4 positive with respect to a second bus B5. The anode of the valve 4V is connected to the positive bus B4 through an anode resistor R9 while the anode of the valve 5V is connected to the positive bus B4 through the energizing winding 44 of the control relay 3CR and a biasing resistor R10. The cathode of the valve 4V is connected through the normally open contacts 1CRa of the relay 1CR to a common point or terminal 46 between the resistors R11 and R12 (which are series connected between the busses B4 and B5) and through resistor R12 to the negative bus B5. The cathode of the valve 5V is directly connected to the terminal 46 and through resistor R12 to bus B5. A commutating capacitor C5 is connected between the anodes of the valves 4V and 5V.

The control grid of the valve 4V is connected through a first timing network 48 to the anode of the valve 5V while the grid of the valve 5V is connected through a weld timing network 50 to the anode of the valve 4V. The timing networks 48 and 50 are similar to the networks 12, 20, and 22 and comprise respectively parallel connected resistors and capacitors R13—C13 and R14—C14. The timing networks 48 and 50 control the duration of time that the valves 4V and 5V are held blocked, while the instant at which the valves 4V and 5V initiate conduction, subsequent to the timing out of the networks 48 and 50, is determined by means of a control voltage placed between their respective shield grids and cathodes derived from the 90° firing peaking transformers 4T and 5T. The primary winding 52 of the transformer 4T is connected between the supply lines L1 and L3 while the primary winding 54 of the transformer 5T is connected between the supply lines L2 and L3. The secondary windings 56 and 58 of the transformers 4T and 5T have one terminal respectively connected together and to the bus B5 and through the resistor R12 to the cathodes of the valves 4V and 5V respectively. The other end terminals of the windings 56 and 58 are respectively connected to the shield grids of the valves 4V and 5V. This connection may include the usual grid current limiting resistors not shown. Resistor R2 provides in the shield grid control circuit of each of the valves 4V and 5V a small blocking bias potential to insure that the tubes 4V and 5V are held blocked by their shield grids until such time as the peaking potential is applied thereto by the transformers 4T and 5T.

The mono-stable pulse and interpulse multivibrator type timing network 4 comprises a pair of valves 6V and 7V energized from a suitable source of direct current bias potential diagramatically shown as being a battery B2 but which, like the source B1, will, in many instances, be a rectifier energized from a pair of the lines L1, L2, and L3. The positive terminal of the supply B2 is connected to the bus B6 and the negative terminal is connected to the aforementioned bus B4. The anode of the valve 6V is connected through an anode resistor R15 to the positive bus B6 while the anode of the valve 7V is connected through a conductor 59, a biasing resistor R16 and the primary winding 60 of a control transformer 6T to the positive bus B6. The cathodes of the valves 6V and 7V are connected together and to a common terminal 62 formed between a pair of series connected resistors R17, R18 connected between the busses B4 and B6 respectively and through the resistor R17 to the negative bus B4.

The control grids of the valves 7V and 6V are connected respectively through a pulse timing network 64 and an interpulse timing network 66 to the anodes of the valves 6V and 7V respectively. These timing networks, as did the timing networks 48 and 50, comprise parallelly arranged capacitors and resistors R19 and C19, R20 and C20. The shield grid of the valve 6V is connected through a usual grid current limiting resistor R21 and a pair of series connected resistors R22, R23 to the anode of the valve 5V. It will be noted that the shield grid circuit continues from the anode of the valve 5V through the winding 44 of the relay 3CR, the resistor R10, bus B4, resistor R17, terminal 62 back to the cathode of the valve 6V.

The shield grid circuit of the valve 7V extends from its shield grid through a usual grid current limiting resistor R24 and a pair of series connected resistors R25 and R26 to the bus B4, from whence it continues back to the cathode of the valve 7V through the biasing resistor R17. The resistors R22 and R23 are alternately energized from a control transformer 7T having its primary winding 68 connected between the lines L1 and L3. One terminal 70 of the secondary winding 72 of this transformer 7T is connected to the common terminal 74 between the resistors R22 and R23. The other terminal 76 of the winding 72 is connected through a dry disk type rectifier 78 to the common terminal 80 between the resistors R21 and R22 and also through a dry disk type rectifier 82 to the free end terminal 83 of the resistor R23. The polarity of the rectifiers 78 and 82 is as shown and provides for alternate energization of the resistors R22 and R23 in a polarity to overcome the negative hold off bias of resistor R17.

The resistors R25 and R26 are similarly connected to the secondary winding 84 of a control transformer 8T having its primary winding 86 connected between the lines L2 and L3. In each of the shield grid control circuits of the valves 6V and 7V the bias resistor R17 applies a small bias tending to render the valves blocked. It will therefore be apparent that the valves 6V and 7V can be rendered conducting only when the voltage between the lines L1—L3 and L2—L3 respectively is above a predetermined minimum value. In this manner, the timing of conduction of the valves 6V and 7V is controlled by the timing networks 64 and 66 while the instant of conduction of the valves 6V and 7V with respect to the alternate current voltage supplied by the lines L1, L2, and L3 is determined by the transformers 7T and 8T.

The networks 64 and 66 are shown as comprising a capacitor shunted by a variable resistor and may be so used. The resistor may be of the potentiometer type or may be of a type in which more or less resistors are switched into or out of the circuit. It is also contemplated that instead of using a variable resistor and/or variable capacitor that the RC units may be of fixed value and units of different value plugged in to change the timing. This latter arrangement, in many instances, is simpler for the unskilled operator.

The bi-stable polarity multivibrator type controlling network 6 comprises the valves 10V and 11V and is shown as being energized from the same direct current source of potential B2 as the network 4. The anodes of the valves 10V and 11V are connected respectively through anode resistors R27 and R28 to the positive bus B6. The cathodes of these valves are connected together to a common conductor 88 to the negative bus B4. The shield grid of the valve 10V is connected through a capacitor C21a to the anode of the valve 11V while the shield grid of the valve 11V is connected through a capacitor C21 to the anode of the valve 10V.

The control grid of the valve 10V is connected through the usual grid current controlling resistor and through the left hand half of the secondary winding 90 of the transformer 6T and from the center tap 92 thereof through conductor 94 to a terminal or common point 96 of a pair of series connected resistors R29 and R30 connected between the busses B4 and B5 respectively. This grid circuit further extends through the resistor R29, bus B4, and common conductor 88 to the cathode of the valve 10V. The control grid of the valve 11V is similarly connected through a grid current controlling resistor and through the right hand half of the secondary winding 90 to the terminal 92 and thence through the resistor R29, bus B4 and common conductor 88 to the cathode of the valve 11V. The resistor R29 provides a blocking grid to cathode bias on the valves 10V and 11V so that they can not initiate conduction except during periods in which the transformer 6T is pulsed to momentarily raise the grid potential. It will be apparent that the transformer 6T is pulsed each time that the valve 7V starts or stops conducting. The polarities of the secondary winding 90 with respect to the primary winding 60 is such that the conductive bias pulses are applied simultaneously to both of the valves 10V and 11V as a consequence of the termination of conduction of the valve 7V. Under these conditions, the network is effective to reverse polarity only as a consequence of the blocking of valve 7V (start of a pulse interval).

Normally, the valve 10V is maintained conducting due to the effect of the normally closed contacts SVCRc which connect the control grid of the valve 10V directly to its cathode. Once the valve 10V has become conducting, however, the contacts SVCRc may be opened without causing the tube 10V to cease conducting since the tube 10V is of the discontinuous control type, as are the other of the valves 1V–19V inclusive, as indicated by the dot. Such opening of SVCRc merely places the network 6 in condition for operation when a signal is placed thereon from the transformer 6T to render the valve 11V conducting. As is usual in a bi-stable multivibrator network, a commutating capacitor C22 is connected between the anodes of the valves 10V and 11V to put out the previously conducting valve as a consequence of the initiation of conduction of the other valve.

The firing control network 8 comprising the valves 12V and 13V is supplied with A.-C. anodt potential from a transformer 9T, the primary winding 98 of which is connected between the supply lines L1 and L2. The secondary winding is center tapped as at 100 to provide a pair of winding portions 102 and 104 having the terminal 100 as their common point. This terminal 100 is directly connected to the cathodes of each of the valves 12V and 13V. The anode of the valve 12V is connected through the primary windings of the transformers 1Ta, 1Tb, and 1Tc to the free end terminal of the winding portion 102 while the anode of the valve 13V is connected through the primary windings of the transformers 2Ta, 2Tb, and 2Tc to the free end terminal of the winding portion 104. For purposes of simplicity, the transformers 1Ta, 1Tb, and 1Tc are shown separately. In actual construction, however, applicant has found it desirable to use a single transformer 1T having a single primary winding connected between the valve 12V and the winding portion 102 and a plurality of secondary windings connected respectively in the grid bias controlling circuits of the firing valves 14V, 16V, and 18V. Similarly, the illustrated transformers 2Ta, 2Tb, and 2Tc are desirably a single transformer having a single primary winding connected between the valve 13V and the winding portion 104 and a plurality of secondary windings connected respectively in the grid biasing circuits of the firing valves 15V, 17V and 19V.

The valves 12V and 13V are normally held blocked due to a bias potential placed between their shield grids and cathodes and derived from the potential appearing across the resistor R16 which normally overcomes a conducting bias potential appearing across a resistor R31.

During pulse times the blocking bias potential across R16 is removed and the resistor R31 becomes ineffective whereby conductivity of the valves is under sole control of the control grids. The resistor R31 is connected in series with a resistor R32 to provide a common point or terminal 106 and these series connected resistors are connected between the busses B6 and B4. The common terminal 106 is directly connected to the cathodes of the valves 12V and 13V. More specifically, the shield grid controlling circuit for these valves extends from the shield grid of each thereof through respective grid current limiting resistors to the conductor 59 which, as stated before, is connected to the bus B6 through the bias resistor R16 and the primary winding 60 of the transformer 6T. The bias circuit continues through the bus B6 and resistor R31 to the cathodes of the valves 12V and 13V. It will be apparent that the terminal 106 is positive with respect to the bus B6 and that during standby conditions there are no drops across the resistor R16 or the winding 60, and therefore both the valves 12V and 13V will be held blocked by a shield grid to cathode bias thereof. In this instance, it will be noted that these valves 12V and 13V are of the thyratron type and that their anode voltages are alternating current so that the grid assumes control each cycle of the supply voltage applied to the transformer 9T.

The control grid of the valve 12V is connected through a rectifier 108 and a current limiting resistor R33 to the anode end of the resistor R27 and therethrough to the bus B6. The control grid of the valve 13V is likewise connected through the rectifier 110, a resistor R34 and resistor R28 to the positive bus B6. The positive bus B6 is, in turn, as above described, connected to the cathodes of the valves 12V and 13V through the biasing resistor R31. The bias potential established by the resistor R31 tends to maintain a conducting bias potential on the control grids of the valves 12V and 13V and which is overcome by the blocking bias potential, which alternately appears across the resistors R27 or R28 to alternately establish a blocking bias potential between the control grid and cathode of the valves 12V or 13V respectively. The valves 12V and 13V, of course, can not conduct as long as a blocking bias is maintained between their shield grids by the resistor R16 but one or the other of the valves 12V or 13V will (in the absence of the shield grid blocking bias) alternately conduct due to the potential appearing across the resistor R31 when the respective resistor R27 and R28 is deenergized.

The ignitrons are connected intermediate the supply lines L1, L2, and L3 and the primary windings 14, 16, and 18 of the welding transformer WT and, as will be explained below, are rendered conducting in a predetermined manner to provide pulses of direct current to these windings 14, 16, and 18 first in a first direction to provide for a build up of flux in one direction and thereafter in a second direction to provide for a build up of flux in the opposite direction whereby an alternating current is induced in the secondary winding to flow through the electrodes E. In the preferred form of the invention, the firing of the ignitrons 11 through 16 is such that the odd numbered ignitrons are fired for a plurality of cycles of the supply voltage and thereafter the even numbered ignitrons are supplied for a plurality of cycles of the supply voltage, whereby the frequency of the output voltage applied to the electrodes E is one half the frequency of the direct current pulses and less than that of the voltage applied to the supply lines L1, L2, and L3, as for example, from a public utility power line, which in the United States, is normally 60 cycles.

The valves 14V, 15V, 16V, 17V, 18V, 19V are respectively connected between the anode and igniters of the ignitrons I1, I2, I3, I4, I5, I6 in the usual manner. When these valves fire, they respectively apply an igniting potential between the igniter and cathode of the ignitrons whereby they are rendered conducting at the same point in the voltage supply wave as is the respective firing valve 14V–19V.

The grid circuit for the firing valve 14V extends from the grid thereof through an RC memory network energized through a rectifier from the secondary winding 112 of the transformer 1Ta, the secondary winding 114 of a transformer 10T and a source of direct potential bias potential 116 to the cathode. Likewise, the grid control circuit of the valves 16V and 18V extend through RC memory networks unidirectionally charged from secondary windings 118 and 120 of the transformers 1Tb and 1Tc and the secondary windings 122 and 124 of the transformers 11T and 12T and through direct potential bias voltage producing devices 126 and 128 to their respective cathodes. Likewise, the control grids of the firing valves 15V, 17V, and 19V are respectively connected through RC memory networks unidirectionally charged from secondary windings 130, 132, and 134 of transformers 2Ta, 2Tb, and 2Tc and secondary windings 136, 138, and 140 of the transformers 10T, 11T, and 12T and then through direct potential bias voltage producing devices 142, 144. and 146 to their respective cathodes.

The primary windings 148, 150, and 152 of the transformers 10T, 11T and 12T (which may be, and preferably are, of the peaking type) are connected into phase shifting networks 154, 156, and 158 respectively. The networks 154, 156, and 158 are identical and of a well known type in which primary windings 160, 162, and 164 of transformers 13T, 14T, and 15T respectively are connected across the supply lines L1—L2, L2—L3, and L3—L1 respectively, whereby the phase shift networks are associated with the same supply line phases as are the groups of ignitrons I1—I2, I3—I4, and I5—I6. The transformers 13T, 14T, and 15T are each provided with center-tapped secondary windings 166, 168 and 170 which have their outer end terminals connected together through series connected reactive and resistive elements C35—R35, C36—R36, and C37—R37. The primary windings of the transformers 10T, 11T and 12T are respectively connected between the center tap of the secondary winding and the common terminal between the reactive and resistive elements of the phase shift networks 154, 156, and 158. Preferably, the magnitude of the resistance of the variable resistors R35, R36, and R37 is adjusted by means of a single operating member so that all of the ignitrons I1, I2, I3, I4, I5, and I6 are fired at the same phase angle of the respective voltages supplied thereto. It will be apparent, however, that, if desired, these may be separately adjustable either to compensate for differences in characteristics of the ignitrons or their firing valves or any other operating characteristics which might render it undesirable to have all of the variable resistors controlled from a single control member.

It is believed that the remainder of the circuit details may best be understood by a description of the operation of the apparatus which is as follows:

Upon closure of the line switch LS1, the lines L1, L2, and L3 are energized to energize the transformers 3T, 4T, 5T, 7T, 8T, 9T, 13T, 14T, 15T. The energization of the transformer 3T provides a source of potential between the busses B1 and B2 of the sequencing network 1. The heater circuits for the valves have not been shown in order to simplify the drawings. However, it will be apparent that when valves having heaters are used, they will be energized in the usual manner upon closure of the line wsitch LS1. Furthermore, a delay arrangement may be provided in accordance with prior art teachings to prevent operation of the apparatus until such time as the valves have been brought to their operating potentials as, for example, a predetermined time interval after closure of the line switch LS1.

Initially, none of the valves 1V, 2V, or 3V of the sequencing circuit will be conducting, all thereof being normally nonconducting during standby operation.

The valve 4V of the network 2 cannot conduct due to its open anode circuit through the contacts 1CRa but, however, the valve 5V will conduct and is normally conducting during standby operation. Conduction of the valve 5V maintains the relay 3CR energized and a potential drop across the biasing resistor R10. Energization of the relay 3CR causes its normally open contacts 3CRa to close and its normally closed contacts 3CRb to open. This is preparatory only and has no operational significance at this time.

The drop across the resistor R10, however, is applied between the shield grid and cathode of the valve 6V and is greater than the conducting bias potential established across the resistors R22 and R23 whereby the shield grid bias holds the valve 6V blocked. No such blocking bias as that across R10 is present in the shield grid circuit of the valve 7V and it is therefore normally conducting. Since 7V is normally conducting, a bias potential is maintained across the resistor R16 which is in the shield grid circuit of the valves 12V and 13V of the network 8. The bias potential established across this resistor R16 is greater than the conducting bias potential established across the resistor R31 and the valves 12V and 13V are thereby both held blocked by their shield grid and cathode bias potentials.

At this time, the normally closed contacts SVCRc of the relay SVCR will be closed and the control grid of the valve 10V will be at the same potential as the cathode of the valve 10V and this valve will be conducting. The potential appearing across the resistor R29 can not influence the grid to cathode potential of the valve 10V but does, however, provide a blocking bias grid to cathode on the valve 11V which is thereby held blocked. In standby condition 10V normally conducts and 11V is normally held blocked.

The valves 12V and 13V of the network 8 are nonconducting due to their shield grid to cathode biases and no potentials will be established in the transformers 1T and 2T whereby the sources of bias voltage in the grid to cathode circuits of the firing thyratrons 14V, 15V, 16V, 17V, 18V, 19V are sufficient to prevent the peaking transformers 10T, 11T, and 12T from applying conducting biases to the firing valves 11V through 19V. The magnitudes of voltages established by the bias voltage sources; the peaking transformers 10T, 11T, and 12T; and the control transformers 1T and 2T are such that the firing tubes 14V to 19V are held blocked unless the transformers 1T or 2T are energized to charge the respective memory RC networks. Since the firing valves 14V through 19V are normally nonconducting, the ignitrons I1—I6, which require a flow of current to their respective igniters to become conducting, are therefore maintained blocked.

It will be assumed that the weld-no-weld switch SW4 is in its closed or weld position and the repeat-non-repeat switch SW3 is in its shown or repeat position. It will further be assumed that a two-stage pilot operation is used and the single-stage-two-stage switch SW5 is in its open or shown position and that the reset switch RSS has been momentarily closed, subsequent to closure of the line switch LS1, to energize the relay ESCR so that the contacts ESCRa and ESCRb are closed and the relay is held energized by the locking contacts ESCRc. The contacts ESCRa complete a circuit for the weld-no-weld control relay NWCR which becomes energized closing its contacts a to f, whereby the firing valves 14V–19V assume control over the firing of the ignitrons I1–I6. The contacts ESCRb render the anode circuit of the valve 1V sensitive only to closure of the start switch SW1.

The switch SW1 is closed to complete the anode circuit for the valve 1V which starts the sequence. When the anode circuit of valve 1V is closed, valve 1V commences to conduct thereby energizing the winding 28 of the relay SVCR. When so energized, the relay closes its normally open contacts SVCRa, SVCRb, and SVCRd and opens its normally closed contacts SVCRc. Closure of the contacts SVCRa is without immediate effect at this time since the circuit therethrough is now open by the normally open contacts 2SCRa of the second stage control relay 2SCR. Closure of the contacts SVCRb is also without effect due to the now open condition of the switches SW2 and SW5. Opening of the contacts SVCRc is without immediate effect since the valve 10V has already been rendered conducting and is of the thyratron type in which the grid has no effect after the valve once commences to conduct. Closure of the contacts SVCRd which control a ram controlling mechanism, not shown but well known in the art, causes the electrodes E to be pressed against the work W with a predetermined force. When two stage operation is used, the sequence is interrupted at this point.

Closure of the second stage pilot SW2 initiates the remainder of the sequence. When SW2 is closed, it connects the cathode of the valve 2V to the bus B3 and through the switch SW1 to the bus B1, whereby the potential of the cathode 2V is transferred from its initial potential (that of the bus B2) to the potential of the bus B1. This terminates further charging of the squeeze timing network 12, which previous to this time had been charging due to grid conduction of the valve 2V through a circuit extending from the bus B1 through the resistor R4, the network 12, grid to cathode of the tube 2V, and resistor R1 to the bus B2. Upon termination of charging of the network 12, its capacitor C6 begins to discharge through the resistor R6 to measure squeeze time. Closure of the switch SW2 also completed the energizing circuit for the relay 2SCR which thereupon became actuated closing its normally open contacts 2SCRa and 2SCRb. Closure of the contacts 2SCRa completed the shunting circuit past the first stage starting switch SW1, which may now be opened without affecting the sequence of operation already established in the sequencing network 1. Closure of the contacts 2SCRb completed an obvious holding circuit in shunt with the second stage pilot switch SW2, which also may now be opened without interfering with the sequence now in progress.

At the end of squeeze time, the potential established across the network 12 will have reached a critical value at which the tube 2V will conduct under influence of the A.-C. ripple placed on the grid biasing circuit thereof by the resistor R4. Conduction of the tube 2V energizes the winding 30 of the control relay 1CR, which thereupon closes its contacts 1CRa to complete the cathode circuit of the valve 4V. Completion of this circuit enables the valve 4V to be rendered conducting at a precise time determined by the peaking transformer 4T which peaks the shield grid-cathode thereof into a conducting bias with respect to its cathode. When this occurs, the valve 4V conducts, causing the tube 5V to become extinguished. Current flow through the valve 4V is limited by the anode resistor R9.

When the valve 5V blocks, the relay 3CR is deenergized opening its contacts 3CRa and closing its contacts 3CRb. Since at this time the bus B3 is connected to the bus B1, through the switch SW1 as well as through the shunting circuit of the now closed contacts SVCRb and 2SCRb, closure of contacts 3CRb causes the relay 4CR to become energized closing its contacts 4CRa and 4CRb. Closure of the contacts 4CRa is preparatory only and without immediate effect due to the now open condition of the contacts 3CRa. Closure of the contacts 4CRb is also without immediate effect but does establish a holding circuit for the relay 4CR when, during subsequent operation of the apparatus, the contacts 3CRb are again opened.

Blocking of the valve 5V and consequent removal of the bias potential appearing across the resistor R10 places the shield grid to cathode bias potential of the valve 6V under control of the blocking bias potential appearing across the resistor R17 and the conducting bias potential periodically appearing across the resistors R22 and R23. It will be apparent from an inspection of the energizing network of these resistors R22 and R23 that they are energized in a polarity to place a conducting potential between the shield grid and cathode of the valve 6V during certain portions of the voltage wave applied to the transformer 7T whereby the valves 6V and 7V can become conducting solely during a small interval of time when the source voltage appearing between the lines L1 and L3 is sufficiently great to overbalance the blocking potential across R17. When this next occurs subsequent to disappearance of the bias across the resistor R10, the valve 6V is rendered conducting. When valve 6V conducts, it extinguishes valve 7V due to the commutating effect of the commutating capacitor C38, and also connects the left hand end of the pulse time network 64 to the cathode of the valve 7V whereby the valve 7V will be held blocked for a time interval depending upon the time characteristics of this network 64.

Blocking of the valve 77 causes two things to happen. One is the removal of the blocking bias between the shield grind and cathode of the valves 12V and 13V, and the other is the pulsing of the polarity controlling network 6. More specifically, the bias potential, which formerly appeared across the resistor R16 and which was applied in the shield grid to cathode circuit of the valves 12V and 13V in opposition to the conducting bias applied thereto by the potential appearing across the resistor R31, disappears to place the conductive condition of the valves 12V and 13V under control of the control grids thereof which in turn are controlled by the network 6. De-energization of the transformer 6T causes the collapsing of the flux therein which provides a transient voltage in its secondary winding 90. This voltage is applied in the controlling grid to cathode biasing circuits of the valves 10V and 11V in the same sense and places a conducting bias on the tubes 10V and 11V. Since the valve 10V is conducting at this time, this biasing pulse can have no effect thereon, but since the valve 11V is at this time blocked, this pulse causes the valve 11V to commence to conduct. When the valve 11V conducts, the commutating capacitor C22 extinguishes the valve 10V and subsequently valve 10V will remain blocked by the bias potential across resistor R29 and the valve 11V continue to conduct. The blocking of 10V eliminated the biasing effect of its anode resistor R27 in the control grid circuit of the valve 12V and the valve 12V commences to conduct each half cycle in which the free end terminal of the winding section 102 is positive with respect to the common terminal 100 thereof. The phasing of transformers 7T and 9T is such that the transformer 1T is energized to charge the RC network in its secondary windings sometime after the transformer 12T has peaked and prior to the peaking of transformer 10T so that the first ignitron to conduct will be I1. Conduction of the valve 11V establishes a potential across its anode resistor R28 which is located in the control grid to cathode biasing circuit for the valve 13V whereby the valve 13V remains nonconducting.

More specifically, conduction of valve 12V energized the transformers 1Ta, 1Tb, and 1Tc to cause the windings 112, 118, and 120 to charge their respective RC networks whereby the peaking transformers 10T, 11T, and 12T are effective to fire the firing valves 14V, 16V and 18V at a particular point in the voltage cycle applied to the ignitrons I1, I3, and I5 as determined by the phase shifting networks 154, 156, and 158 respectively. Firing of the ignitron I1 establishes a circuit for unidirectional current flow between the lines L1 through the ignitron I1, winding 14, back to line L2 whereby flux is built up in the core of the welding transformer WT in a first direction. Firing of the ignitron I3 completes a circuit from the line L2 through the ignitron I3, the second winding 16, to the line L3. Current flow through this winding 16 causes a further build up of flux in the transformer WT. Likewise, conduction of the ignitron I5 completes a circuit between the line L3 through the ignitron I5, winding 18, to line L1 for flow of current through the winding 18 whereby the flux in the core of the welding transformer WT is also built up in this same first direction. It will be apparent that the ignitrons I1, I3 and I5 will conduct in sequence in accordance with the three phase voltage waves supplied by the lines L1, L2, and L3 and at times as determined by the heat control networks 154, 156, and 158 to provide for a progressive build up of flux in the transformer at a desired rate to cause a flow of current between the electrodes E through the work W in a first direction. The pulse timing network 64 times the interval during which energy is supplied from the lines L1, L2, and L3 to the welding transformer WT. When the network 64 times out, it permits the valve 7V to reconduct. When the valve 7V reconducts, it reestablishes current flow through the primary winding 60 of the transformer 6T and through the resistance R16. The reestablishment of the bias voltage across the resistor R16 reestablishes the blocking bias voltage between the shield grids and cathodes of both of the valves 12V and 13V holding both thereof blocked. The reestablishment of this bias voltage on the valve 13V is without effect since it was already held blocked by its control grid to cathode bias. However, establishment of such shield grid to cathode bias prevents the valve 12V from again becoming conducting to energize the transformers 1T. Reestablishing of current flow through the winding 60 of transformer 6T is of a resetting nature and places the transformer 6T in a condition to conductively bias the valves 10V and 11V at the start of a subsequent pulse time.

When the valve 7V commenced to conduct, it caused the commutating capacitor C38 to extinguish the valve 6V. The valve 6V, upon extinguishment, is held blocked for a predetermined interpulse time by the timing network 66. Each half cycle of output from the welding transformer is made up of a pulse time during which current flows from the lines L1, L2, and L3 to the transformer WT to cause a build up of flux therein and an interpulse time during which flux collapses in the transformer WT preparatory to the initiation of a subsequent build up of flux in the opposite direction.

When valve 12V ceased conduction, it no longer energized the RC networks in the control circuits of the firing valves 14V, 16V, and 18V and they rapidly discharge so that these firing valves are not fired to render the ignitrons I1, I3, and I5 conducting. Further flow of current to the welding transformer from the lines L1, L2, and L3 is thereby terminated. The time constant of the RC network in the control circuits of the firing valves 14V-19V is such that unless they are charged during the cycle as indicated (just prior to network 154 producing a conducting pulse on transformer 10T) the valves 14V-19V will remain nonconducting.

At the end of a predetermined interpulse time, the timing network 66 times out permitting the valve 6V to reconduct and terminate conduction of the valve 7V. This terminates further flow of current through the primary winding 60 of transformer 6T and the resistor R16. The disappearance of the bias voltage across the resistor R16 removes the blocking bias between the shield grid and cathode of the valves 12V and 13V rendering them again responsive to their control grids as above described. Termination of current flow through the primary winding 60 causes a pulse of voltage to be applied by the secondary winding 90 to the control grids of the valves 10V and 11V. At this time, however, the valve 11V will be conducting and the valve 10V blocked so that when this control pulse is applied thereto, the valve 10V will reconduct and through the commutating capacitor C22 will extinguish the valve 11V thereby removing the bias voltage previously existing across the anode resistor R28 and energize the resistor R27 to establish a bias potential thereacross. This removal of potential across the resistor R28 and reestablishing of the potential across the resistor R27 removes the blocking bias between the control grid and cathode of the valve 13V and applies a blocking bias between the control grid and cathode of the valve 12V. Under this condition, the valve 13V will conduct each half cycle of voltage in which the free end of the winding portion 104 is positive with respect to the common terminal 100, to periodically energize the transformers 2Ta, 2Tb, and 2Tc. Upon energization of these transformers 2T, the phase shift network energized peak-transformers 10T, 11T, and 12T will be effective to render the firing valves 15V, 17V, and 19V conducting to fire the ignitrons I2, I4, and I6 for flow of current to the primary windings 14, 16, and 18 of the welding transformer WT whereby current flow thereto will progressively build up the flux in the core in the opposite direction to the direction in which the flux was built up due to conduction of the ignitrons I1, I3, and I5, whereby current in the opposite direction will flow between the electrodes E through the work W.

At the end of a predetermined pulse time as again determined by the pulse timing network 64, the valve 7V will again reconduct to reestablish the bias potential across the resistor R16 and prevent further conduction of the valves 12V and 13V with the result that further firing of the ignitrons will be prevented. This alternate firing of the valves 6V and 7V will continue to provide for a series of pulse and interpulse times and, due to its actuation through the networks 6 and 8, will provide for build up of flux in the core of the welding transformer periodically in opposite directions at a frequency determined by the sum of pulse time and interpulse time. The sum of these intervals for most satisfactory results should be an odd number of half cycles of the source frequency.

At some instant, the weld timing network 50 will time out permitting the valve 5V to reconduct and to extinguish the valve 4V. Reconduction of the valve 5V reestablishes a bias potential across the resistor R10 which, as described above, prevents further reconduction of the valve 6V of the frequency timing network 4. If the valve 6V is conducting at this instant it will continue to conduct until the pulse time is over (7V reconducts). If the valve 6V is blocked at this instant, (7V conducting) it will prevent 6V from again conducting to initiate a new pulse time. Preferably, the weld time interval is so adjusted that the network 50 times out after an even number of half cycles of welding power so that there is no tendency for a direct current component of flux to build up in the welding transformer WT. If such is not the case and sufficient time elapses between welding sequences, satisfactory welds will still be produced. As long as valve 7V conducts it continuously establishes a blocking bias potential across the resistor R16 to maintain the valves 12V and 13V blocked to prevent refiring of the ignitrons.

Reconduction of valve 5V also energized the control relay 3CR whereby its normally open contacts 3CRa are closed and its normally closed contacts 3CRb are opened. Opening of the contacts 3CRb is without effect due to the now closed condition of the locking contacts 4CRb of the relay 4CR, which are in shunt therewith. Closure of the contacts 3CRa, however, does complete the cathode circuit for the valve 3V of the sequencing network 1 thereby transferring the potential of the cathode thereof from approximately that of the bus B2 to that of the bus B3. This terminates further flow of charging current to the hold time network 20, which prior to that time had been charging due to grid current flow between the bus B1 through the network 20 grid to cathode of the valve 3V, resistor R5, and to bus B2. At the end of a predetermined hold time period, the charge on the capacitor C7 will have sufficiently discharged through the resistor R7 so that the bias potential across the hold time network 20 is reduced to a critical value which when combined with the A.-C. ripple voltage derived from the resistor R4 will cause the valve 3V to conduct. Anode current flow through the valve 3V charges the off time network 22 which places a blocking bias voltage between the grid and cathode of the valve 1V terminating further conduction thereof and causing the solenoid valve control relay SVCR to become deenergized opening its contacts SVCRa, SVCRb, and SVCRd and closing its contacts SVCRc.

Opening of the contacts SVRd actuates the ram mechanism in such a manner that the electrodes E are removed from the work W. Opening of the contacts SVCRa opens the circuit which shunts the first stage pilot switch SW1 and is without effect so long as the switch SW1 is maintained closed, which will, of course, be the situation during repeat operation until it is desired to terminate the sequence. It will be noted that the back contacts 2SCRb of the relay 2SCR maintain this relay energized as long as either the first stage pilot switch SW1 remains closed or its shunting circuit remains closed. Therefore, once the sequencing network 1 has been placed into operation by closing both the pilot switch SW1 and SW2, it will be maintained in a sequencing operation as long as the pilot switch SW1 is maintained closed.

Opening of the contacts SVCRb interrupts the anode circuit for the valve 2V whereby the relay 1CR in its anode circuit is deenergized opening its contacts 1CRa in the anode circuit through the now blocked valve 1V. The opening of contacts 1CRa insures that the valve 4V will not refire to initiate a welding operation. It is to be noted that during the interval between the blocking of 4V due to the reconduction of 5V, it was held blocked by the timing network 48 in its grid circuit. The interval of network 48 must be of such duration that it will not time out prior to opening of the contacts 1CRa but which may time out any time thereafter and before the off time network 22 times out. The network 48 is so related to the hold time network 20 and off time network 22 as to accomplish this effect.

Opening of the contacts SVCRb also opens the energizing circuit of the relay 4CR, which thereupon opens its contacts 4CRa, opening the anode circuit through the valve 3V. This terminates further charging of the off time network 22, whereby the capacitor C8 thereof commences to discharge at a predetermined rate through the resistor R8. At the end of a predetermined off time, the potential across the off time network 22 coupled with the A.-C. ripple across the resistor R2, has reached a critical potential at which the valve 1V refires to reenergize the relay SVCR, to provide for a repeating operation as above described.

It should be noted that the closure of the contacts SVCRc of the relay SVCR upon deenergization thereof, closed to remove any blocking bias potential between the control grid and cathode of the valve 10V whereby this valve is maintained conducting during standby operation and, as explained above, when the valve 10V conducts, it acts through the commutating capacitor C22 to block the valve 11V. If at this time, which is the case during standby operation, no potential is being supplied by the transformer 6T to overcome the blocking bias established on the valve 11V by the potential drop across the resistor R17, the valve 11V cannot conduct and the network 6 remains with 10V conducting and 11V blocked, so that it always initiates operation of the apparatus with the odd numbered ignitrons.

If second stage pilot operation is not desired, the switch SW5 may be closed, whereby the second stage relay 2SCR is energized as a consequence of closing of the first stage pilot switch SW1. In such event, closure of the switch SW1 not only results in an actuation of the ram mechanism to move the electrodes E against the work W, but also results in a timing operation of the squeeze time network 12 to initiate a sequence of operation.

If it is desired to run the control through a complete sequence without firing the ignitrons I1–I6, the weld-no-weld switch SW4 is opened preventing energization of the weld-no-weld control relay NWCR whereby its contacts a–f remain open to prevent the firing tubes 14V–19V from firing the ignitrons I1–I6. Also, if it is desired that only a single sequence of operation occur, as a result of a single closing of the switch SW1 and/or SW1 and SW2, as the case may be, the repeat-non-repeat switch SW3 is moved from its shown position to its other position in which the arm thereof engages the contact NR so that the contacts SVCRb are removed from the energizing circuit of the winding 42 of the relay 4CR. With such an arrangement, once the relay 4CR is energized its back or locking contacts 4CRb will maintain this relay energized subject only to opening of the pilot switch SW1. Under these operating conditions, 4CR will remain energized, maintaining its contacts 4CRa closed and the anode circuit of the valve 3V completed so that the off time network 22 is prevented from timing out until such time as the switch SW1 is opened. With this operation, it is often desirable to provide a second switch arm on the switch SW3 which, when it is in its non-repeat position, shunts the resistor R8 whereby the discharge of the capacitor C8 is subject only to the resistor R38 whereby the capacitor C8 times out repeatedly so that the valve 1V can again become conducting upon reclosure of the pilot switch SW1.

In accordance with the requirements of the patent statutes, there is shown herein the best presently known embodiment of this invention, but it should be remembered, however, that the drawings are to be taken as illustrative rather than limitative, and the scope of the invention is to be limited solely by the scope of the hereinafter appended claims.

If desired the initiation of conduction of valve 7V may be used to pulse the network 6. If such is done it will be necessary to arrange the transformer 9T relative to the transformer 7T such that the valve 6V is rendered conducting at least by the 60° point of the potential being applied in a positive direction, anode to cathode, of the first ignitions I1 or I2 which is the first to fire as is described above.

What is claimed and desired to be secured by United States Letters Patent is as follows:

1. In an apparatus for controlling the flow of power from a polyphase source to a pair of resistance welding electrodes energized from a single phase circuit, a first or polarity controlling multivibrator network comprising a pair of discontinuous control-type valves individually coupled to a source of unidirectional potential through a pair of impedance devices, a second or firing control network comprising a pair of discontinuous control-type valves, each said last-named pair of valves having a pair of principal electrodes, one of said electrodes of each said last-named valves individually coupled to electrically spaced terminals of a source of alternating potential and the other of said electrodes of each said last-named pair of valves being connected to said source intermediate said spaced terminals whereby one said valve of said second network conducts during one half cycle of said source and the other said valve of said second network conducts during the opposite half cycle of said source to said one half cycle, a first circuit means coupling said one valve to a first valve of said first multivibrator whereby the conduction of said first valve controls the conductive condition of said one valve, and a second circuit means coupling said other valve to a second valve of said first multivibrator whereby the conduction of said second valve controls the conductive condition of said other valve.

2. The combination of claim 1 in which a control network is provided to control the conductive condition of said valves of said firing network independently of said valves of said first network.

3. The combination of claim 1 in which each said valve of said firing network includes a first control electrode, said first circuit means includes the one of said impedance devices which is associated with said first valve, said first circuit means further being connected between said control electrode and one of said principal electrodes of said one valve, said second circuit means includes the one of said impedance devices which is associated with said second valve, said second circuit means further being connected between said control electrode and one of said principal electrodes of said other valve.

4. The combination of claim 3 in which each said valve of said second network includes a second control electrode, and circuit means connected between said second control electrodes and a principal electrode of said valves of said second network and actuated in concert with said first network to control the conduction of said valves of said second network.

5. In an apparatus of the character described, a first and a second terminal adapted to be energized from a direct potential source, a first and a second thyratronic type of valve, each said valve having an anode and a cathode and a first and second control electrodes, a first and second impedance device, first circuit means connecting said anode of said first valve through said first impedance device to said first terminal and said cathode of said first valve to said second terminal, second circuit means connecting said anode of said second valve through said second impedance device to said first terminal and said cathode of said second valve to said second terminal, a first capacitor connected between said first control electrode of said first valve and said anode of said second valve, a second capacitor connected between said first control electrode of said second valve and said anode of said first valve, a capacitor connected between said anodes, a third circuit connecting each said second control electrode to the said cathode with which it is associated, means in one of said third circuits for normally applying a blocking bias potential between a control electrode and the said cathode with which it is associated, switch means associated with one of said control electrodes of one of said valves for connecting said last-mentioned control electrode to said one valve cathode, and means effective when said switch is in open circuit condition to concurrently bias each said valve conductive.

6. In a network of the character described, a pair of thyratronic type valves each having an anode and a cathode and a pair of control electrodes, a first and a second terminal adapted to be supplied from a source of alternating potential, a third terminal associated with said first and second terminals and being maintained at a potential intermediate said first and second terminals, a first and a second bias potential producing device, a first anode circuit connecting said anode of a first of said valves through said first bias device to said first terminal and said cathode of said first valve to said third terminal, a second anode circuit connecting said anode of a second of said valves through said second bias device to said second terminal and said cathode of said second valve to said third terminal, a first biasing circuit connected between a first control electrode of each said pair and said cathodes and including means for establishing a blocking bias potential on said valves, a second biasing circuit connected between a second control electrode of each said pair and said cathodes and including means for concurrently placing a blocking bias on one of said valves and a conducting bias on the other said valve in alternating sequence, and means for concurrently actuating said biasing circuits to remove said blocking bias potential supplied by said first bias circuit and to reverse the application of bias potentials by said second biasing circuit.

7. A control device for controlling the flow of energy from a polyphase source to a single phase resistance welding load in which each phase of the source is connected to said load through a pair of anti-parallel arranged electric space discharge valves and in which there is provided a relative movable pair of welding electrodes comprising the combination of a sequencing network including means for controlling the movement of the electrodes and means for timing the weld time period in which the discharge devices are effective to supply energy to the load, an initiating device for actuating said sequencing network whereby said electrode controlling means is actuated to move the electrodes into welding position, said network including a squeeze timing device effective subsequent to a predetermined time interval after actuation of said electrode controlling means for initiating said weld timing means, a first device of each of said pairs of discharge devices being poled to permit flow of current in a first direction and a second device of each of said pairs of discharge devices being poled to permit flow of current in a second direction, a firing circuit for selectively firing either said first discharge devices or said second discharge devices, a polarity selecting unit connected to actuate said firing circuit and having a first operating condition and a second operating condition, said selecting unit when in said first operating condition being effective to cause said firing circuit to render solely said first discharge device conducting and when in said second operating condition being effective to render solely said second discharge device conducting, a pulse timing circuit for determining the length of a pulse time in which at least some of said discharge devices may conduct, an interpulse time between the periods in which the discharge devices are fired, means interconnecting said pulse timing circuit and said firing circuit whereby said firing circuit is rendered effective to fire at least some of said discharge devices during a pulse time and ineffective to fire any of said devices during an interpulse time, means actuated by said pulse timing circuit for actuating said polarity selecting unit from one of its said operating conditions to another said operating condition, means interconnecting said weld timing means and said pulse timing network and actuated as a consequence of the initiation of a weld timing period to actuate said pulse timing network and actuated as a consequence of the timing out of said weld timing means for rendering said pulse timing network ineffective to initiate a new pulse timing interval, means interconnecting said weld timing means and said electrode controlling means whereby said electrode controlling means is actuated as a consequence of the timing out of said weld timing means, and means interconnecting said pulse timing network and said firing circuit whereby said firing circuit is rendered effective to fire said discharge devices solely during a pulse time.

8. In a device of the character described, a firing network for selective firing a first and a second discharge means, a polarity determining network connected to said firing network and effective as a consequence of successive actuation to cause said firing network to successively fire said first and said second discharge means, a pulse timing network for determining the length of time said firing network is effective to fire said discharge means, and means interconnecting said pulse timing network with said polarity determining network and said firing network for actuating said polarity determining network and rendering said firing network effective to fire one of said discharge means.

9. The combination of claim 8 in which there is additionally provided means operable in a first condition to initiate an operation of said pulse timing network and in a second condition to reset said polarity network to an initial condition.

10. In a sequencing device, a first and a second terminal adapted to be energized from a source of unidirectional potential, a first and a second thyratronic type valve each having an anode and a cathode and control electrode means, a first impedance device and a first relay having an energizing winding, a first and a second timing network each comprising a capacitor connected in parallel with a resistor, means connecting said anode and cathode of said first valve and said first impedance device in series between said terminals and including normally open contacts of a second relay, means connecting said anode and cathode of said second valve and said winding between said terminals, means connecting said first timing network between said control means of said first valve and said anode of said second valve and said second timing network between said control means of said second valve and said anode of said first valve, a commutating capacitor connected between said anodes, a third and a fourth terminal adapted to be energized from a source of alternating potential, third and fourth and fifth thyratronic type valves each having an anode and a cathode and a control means, third and fourth and fifth timing networks each comprising a capacitor connected in parallel with a resistor, means including a normally open switch and the winding of a third relay connecting said anode of said third valve to said third terminal, said cathode of said third valve being connected to said fourth terminal, means including the winding of said second relay connecting said anode of said fourth valve to said fourth terminal, means including a pair of normally open contacts of said third relay and said normally open switch connecting said cathode of said fourth valve to said third terminal, means including said third timing network connecting said anode of said fifth valve to said fourth terminal, means including normally open contacts of said first relay and of a fourth relay and said normally open switch connecting said cathode of said fifth valve to said third terminal, impedance means individually connecting said cathodes of said fourth and fifth valves to said fourth terminal, and means including contacts of said first relay and of said fourth relay and of said third relay and said normally open switch connecting the winding of said fourth relay between said third and fourth terminals.

11. In a network of the character described, a pair of busses adapted to be energized from a source of alternating potential, a plurality of thyratrons each having an anode and a cathode and a control electrode, a plurality of relays each having an energizing winding and pairs of circuit controlling contacts, a plurality of time delay networks each comprising a capacitor connected in shunt circuit with a resistor, an initiating switch having normally open contacts, a first anode circuit for a first thyratron of said plurality of thyratrons connected between said busses and including said anode and said cathode of said first thyratron and said winding of a first of said relays and said contacts of said initiating switch, a shunt circuit for said initiating switch including a first pair of normally open circuit controlling contacts of said first relay, a second anode circuit for a second thyratron of said plurality of thyratrons connected between said busses and including said anode and said cathode of said second valve and said winding of a second of said relays and a first pair of normally open circuit controlling contacts of said first relay and said initiating switch, a third anode circuit for a third of said plurality of thyratrons connected between said busses and including said anode and said cathode of said third thyratron and a first of said time delay networks and a first pair of normally open contacts of a third of said relays and a first pair of normally open contacts of a fourth of said relays and said initiating switch, means connecting an impedance element between said cathode of said second thyratron and one of said busses, means connecting an impedance element between said cathode of said third thyratron and one of said busses, means connecting said anode of said third thyratron to said control electrode of said first thyratron, means connecting a second of said time delay networks between said control electrode of said second thyratron and one of said busses, means connecting a third of said time delay networks between said control electrode of said third thyratron and one of said busses, circuit means connected between said busses and including said winding of said third relay and parallelly arranged normally open contacts of said third relay with normally closed contacts of a fourth of said relays and in series with said second pair of contacts of said first relay and said initiating switch, and means actuated by said first relay to sequentially de-energize and re-energize said fourth relay.

12. In an apparatus of the character described, a pair of mono-stable multivibrator networks, each of said networks being energized from a separate source of unidirectional potential and each comprising a first and a second discontinuous type electric valve and a first and a second timing network, each said valve having an anode and a cathode and a pair of control electrodes, means individually connecting said first timing networks between a first of said control electrodes of said first valves and said anodes of said second valves, means individually connecting said second timing networks between a first of said control electrodes of said second valves and said anodes of said first valves, said networks each including first and second bias circuits, each said bias circuit being individually connected between a second of said control electrodes and said cathodes of said valves and each including a source of blocking potential and a periodically pulsating voltage producing device of such magnitude as to periodically place a conducting bias on said just-mentioned valves, an impedance device connected to said anode of one of said valves of said first network, one of said bias circuits of said second network including said impedance device, and means separate from said bias circuits and said timing networks which are associated with said first network for preventing current flow through one of said valves of said first network.

13. The combination of claim 12 in which said pulsating voltage devices associated with one of said networks are peaking transformers and in which said pulsating voltage devices associated with the other said networks are full wave rectifiers void of storage devices.

14. In an apparatus of the character described, a first mono-stable multivibrator network and a second bi-stable multivibrator network, each said network comprising a pair of discontinuous control type valves, each said valve having a pair of main electrodes and control means, said first network including timing means for rendering said valves of said first network alternately conducting in predetermined timed succession, said first network further including biasing means connected between said control means and one of said main electrodes of said valves of said first network for firing said valves at predetermined instants with respect to an external sequence, said second network including a pair of bias circuits individually connected between said control means and one of said main electrodes of said valves of said second network, each said pair of bias circuits including a source of bias potential poled to bias the respective said valve with which it is associated in a blocking direction, a transformer having a pair of secondary windings and a primary winding, said secondary windings being individually connected in said last-mentioned bias circuits, said primary winding being connected to a said main electrode of one of said valves of said first network.

15. The combination of claim 14 in which one of said bias circuits of said second network includes means to render ineffective said bias source associated therewith whereby the said valve with which it is associated is rendered conducting irrespective of the last-mentioned bias source.

16. In a device of the character described, a pulse timing network, a firing control network, said pulse timing network comprising a mono-stable multivibrator having a first and a second thyratronic type valve, means operable to control said multivibrator and effective in a first condition to maintain said second valve conducting and said first valve nonconducting, a first timing circuit connected to said first valve and effective upon blocking of said first valve to maintain said first valve blocked for an interpulse time period, a second timing circuit connected to said second valve and effective upon blocking of said second valve to maintain said second valve blocked for a pulse time, an impedance device, means serially connecting said impedance device in the anode circuit of said second valve, said firing network comprising a third and fourth valves and an anode transformer having secondary winding with end terminals and a center tap, a first control transformer and a second control transformer, each having a primary winding and a secondary winding, said primary winding of said first control transformer being connected in series with said third valve between a first of said end terminals and said center tap, said primary winding of said second control transformer being connected in series with said fourth valve between the other of said end terminals and said center tap, and a bias circuit connected to said third and fourth valves and connected to said impedance device associated with said second valve.

17. In a device for controlling the flow of energy from a polyphase supply to a single phase resistance welding load, a weld timing network, a pulse timing network, a polarity reversing network, a firing control network, said weld timing network comprising a mono-stable multivibrator network including a first and a second valve, switch means having normally open contacts in the anode circuit of said first valve, a first timing circuit connected to said first valve and effective upon blocking of said first valve to maintain said first valve blocked for a period of time, a second timing circuit connected to said second valve and effective upon blocking of said second valve to maintain said second valve blocked for a weld timing period, said pulse timing network comprising a mono-stable multivibrator having a third and a fourth valve, means controlled by said weld timing network and effective when said second valve is conducting to maintain said fourth valve conducting and said third valve nonconducting, a third timing circuit connected to said third valve and effective upon blocking of said third valve to maintain said third valve blocked for an interpulse time period, a fourth timing circuit connected to said fourth valve and effective upon blocking of said fourth valve to maintain said fourth valve blocked for a pulse time, said polarity reversing network comprising a bi-stable multivibrator having a fifth and a sixth valve, a transformer having a primary and a secondary winding, an impedance device, means serially connecting said primary winding and said impedance device in the anode circuit of said fourth valve, a bias circuit for said fifth and sixth valves and including said secondary winding and a source of hold off bias potential, said bias circuit normally acting to bias said fifth and sixth valves nonconducting but being operable upon a change in energization of said transformer to bias both said fifth and sixth valves conducting, said firing network comprising a seventh and eighth valves and an anode transformer having secondary windings with end terminals and a center tap, a first control transformer and a second control transformer, each having a primary winding and a secondary winding, said primary winding of said first control transformer being connected in series with said seventh valve between a first of said end terminals and said center tap, said primary winding of said second control transformer being connected in series with said eighth valve between the other of said end terminals and said center tap, a control circuit connected to said seventh and eighth valves and having three control points, one of said points being connected to said fifth valve, a second of said control points being connected to said sixth valve and a third of said control points being connected to said impedance device associated with said fourth valve.

18. In a control circuit, a discontinuous type tube having an anode and a cathode and a control electrode, a bias circuit connected between said control electrode and said cathode, said circuit comprising three sources of bias potential, a first of said sources being of unidirectional polarity and of substantially constant magnitude and poled in a direction such as to bias said control electrode negative with respect to said cathode, a second of said sources comprising a peaking transformer, a third of said sources comprising an R.-C. network, rectifier means for unidirectionally charging said R.-C. network in such polarity as to oppose said first source, and a control transformer connected through said rectifier means to said R.-C. network.

References Cited in the file of this patent
UNITED STATES PATENTS

| | | |
|---|---|---|
| 2,295,601 | Overbeck | Sept. 15, 1942 |
| 2,715,698 | Riley et al. | Aug. 16, 1955 |
| 2,735,037 | Stadium et al. | Feb. 14, 1956 |
| 2,740,044 | Storm | Mar. 27, 1956 |
| 2,780,750 | Parsons | Feb. 5, 1957 |
| 2,800,624 | Riley | July 23, 1957 |

UNITED STATES PATENT OFFICE

CERTIFICATE OF CORRECTION

Patent No. 2,878,365                                              March 17, 1959

William F. Minard

It is hereby certified that error appears in the printed specification of the above numbered patent requiring correction and that the said Letters Patent should read as corrected below.

Column 1, lines 61 and 71, for "ignitions", each occurrence, read -- ignitrons --; same column 1, line 71, for "bulding" read -- building --; column 2, line 2, for "ignitions" read -- ignitrons --; line 39, for "values" read -- valves --; column 6, line 44, for "anodt" read -- anode --; column 7, line 60, for "11 through 16" read -- Il through I6 --; column 8, line 66, for "wsitch" read -- switch --; column 11, line 22, for "77" read -- 7V --; line 24, for "grind" read -- grid --; column 12, line 1, for "second" read -- secondary --; column 14, line 13, for "SVRd" read -- SVCRd --.

Signed and sealed this 1st day of December 1959.

(SEAL)
Attest:

KARL H. AXLINE                                                    ROBERT C. WATSON
Attesting Officer                                           Commissioner of Patents